US012707552B2

(12) United States Patent
Lei et al.

(10) Patent No.: US 12,707,552 B2
(45) Date of Patent: Aug. 11, 2026

(54) ELECTRO-STATIC DISCHARGE PROTECTION STRUCTURE AND ELECTRONIC DEVICE

(71) Applicant: HONOR DEVICE CO., LTD., Shenzhen (CN)

(72) Inventors: Fenxing Lei, Shenzhen (CN); Yin Meng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 391 days.

(21) Appl. No.: 18/291,166

(22) PCT Filed: Apr. 26, 2022

(86) PCT No.: PCT/CN2022/089279

§ 371 (c)(1),
(2) Date: Jul. 18, 2024

(87) PCT Pub. No.: WO2023/024551

PCT Pub. Date: Mar. 2, 2023

(65) Prior Publication Data

US 2025/0331090 A1 Oct. 23, 2025

(30) Foreign Application Priority Data

Aug. 27, 2021 (CN) ........................ 202110993811.6

(51) Int. Cl.
*H05F 3/02* (2006.01)
*H04M 1/02* (2006.01)

(52) U.S. Cl.
CPC ............ *H05F 3/02* (2013.01); *H04M 1/0214* (2013.01); *H04M 1/0268* (2013.01)

(58) Field of Classification Search
CPC .. H05F 3/02; H05F 3/00; H04M 1/02; H04M 1/0214; H04M 1/0268; H05K 9/00; H05K 9/0067; H05K 1/028

(Continued)

(56) References Cited

U.S. PATENT DOCUMENTS 10,551,663 B2 2/2020 Gu et al.
10,642,113 B2 5/2020 Huang et al.

(Continued)

FOREIGN PATENT DOCUMENTS

CN 203643704 U 6/2014
CN 104698664 A 6/2015

(Continued)

*Primary Examiner* — Danny Nguyen
(74) *Attorney, Agent, or Firm* — WOMBLE BOND DICKINSON (US) LLP

(57) ABSTRACT

This application illustrates an electro-static discharge protection structure and an electronic device. One end of the metal partition wall is connected to the metal housing, the other end of the metal partition wall extends in a direction away from the metal housing, to form an end surface at one end away from the metal housing, and a screen module is disposed on a side of the metal partition wall; A continuous conductive layer is disposed between the insulation frame and the screen module; the insulation frame comprises a junction surface, which faces the end face of the metal partition wall; an insulation layer is disposed between the conductive layer and the end surface; and the insulation layer is an insulation layer that can be broken down by static electricity. The electro-static discharge protection structure prevents a problem of RSE and further affecting antenna performance, and prevents secondary discharge.

20 Claims, 5 Drawing Sheets

(58) Field of Classification Search
USPC .................................................. 361/212, 220
See application file for complete search history.

(56) References Cited

U.S. PATENT DOCUMENTS

| | | | |
|---|---|---|---|
| 2008/0081679 A1 | 4/2008 | Kawasaki et al. | |
| 2010/0156857 A1 | 6/2010 | Nozaki | |
| 2021/0064092 A1 | 3/2021 | Kwon et al. | |
| 2024/0324157 A1* | 9/2024 | Liu ...................... | H05K 9/0067 |

FOREIGN PATENT DOCUMENTS

| | | | |
|---|---|---|---|
| CN | 106154632 | A | 11/2016 |
| CN | 107124809 | A | 9/2017 |
| CN | 107645872 | A | 1/2018 |
| CN | 107664886 | A | 2/2018 |
| CN | 108023978 | A | 5/2018 |
| CN | 207531214 | U | 6/2018 |
| CN | 108770162 | A | 11/2018 |
| CN | 208314396 | U | 1/2019 |
| CN | 210671188 | U | 6/2020 |
| CN | 113710030 | A | 11/2021 |
| JP | 1990120859 | U | 9/1990 |
| JP | 2006135842 | A | 5/2006 |
| JP | 2008106932 | A | 5/2008 |
| JP | 2011170200 | A | 9/2011 |
| JP | 2014036267 | A | 2/2014 |

* cited by examiner

ELECTRO-STATIC DISCHARGE PROTECTION STRUCTURE AND ELECTRONIC DEVICE

CROSS-REFERENCE TO RELATED APPLICATIONS

This application is a national stage of International Application No. PCT/CN2022/089279 filed on Apr. 26, 2022, which claims priority to Chinese Patent Application No. 202110993811.6 filed on Aug. 27, 2021. The disclosures of both of the aforementioned applications are hereby incorporated by reference in their entireties.

TECHNICAL FIELD

This application relates to the field of electro-static discharge protection technologies, and in particular, to an electro-static discharge protection structure and an electronic device.

BACKGROUND

In an electronic device such as a mobile phone, there may be static electricity on a side edge of a screen module. Electro-static discharge may cause frequent freezing, automatic power-off, poor image quality and volume, unstable signal quality, and the like of the mobile phone. Therefore, the electro-static discharge (Electro-Static discharge, ESD) has become important content for quality control of an electronic product. Compared with a conventional screen, a flexible screen has features of flexibility and foldability, and provides a user with a new foldability-based interaction mode, to meet more requirements of the user for the electronic device. Because the flexible screen is deformed while being folded, design of an electro-static discharge protection structure located on a side edge of a screen module of the flexible screen is confronted with more challenges.

An existing electro-static discharge protection structure is used in a side edge of a screen module of a foldable flexible screen in the following two ways. In a first way, the electro-static discharge protection structure is fastened to a metal housing of an electronic device with conductive adhesive to discharge static electricity by grounding. In a second way, the electro-static discharge protection structure discharges static electricity to the metal housing in a manner of discharge in a gap.

However, the following problems exist in the foregoing two ways. In the first way, conductive adhesive is dispensed to ensure stability of the electro-static discharge protection structure. This increases a width of a black edge of a screen. In addition, this grounding manner may cause a risk of radiated spurious emission (Radiated Spurious Emission, RSE) to an antenna due to poor grounding, and affect antenna performance. In the second way, a gap between the electro-static discharge protection structure and the metal housing is changed while the flexible screen is deformed in a folding process, and a risk of secondary discharge is caused due to change of the gap.

SUMMARY

Embodiments of this application provide an electro-static discharge protection structure and an electronic device, to prevent risks of RSE and secondary discharge caused by poor grounding.

According to a first aspect, this application provides an electro-static discharge protection structure. One end of a metal partition wall is connected to a metal housing, and the other end of the metal partition wall extends in a direction away from the metal housing. An end surface is formed at one end away from the metal housing. A screen module is disposed on a side of the metal partition wall. An insulation frame includes a first side edge, a connection part, and a second side edge. The first side edge is disposed on a side, opposite to the screen module, of the metal partition wall. The connection part is disposed at one end, away from the metal housing, of the first side edge. The connection part includes a junction surface attached to the end surface and a first surface facing the screen module. An insulation layer is disposed between the junction surface and the end surface. The second side edge is disposed on a side, facing the screen module, of the connection part. The second side edge includes a second surface facing the screen module. A continuous conductive layer is disposed on the junction surface, the first surface, and the second surface.

According to the electro-static discharge protection structure provided in this application, because the insulation layer is disposed between the junction surface and the end surface without static electricity, direct current insulation is implemented between the junction surface and the end surface. This prevents a risk of RSE caused by conventional poor grounding. When entering from a side edge of the screen module, the static electricity is conducted to the junction surface through the continuous conductive layer disposed on the second surface, the first surface, and the junction surface. Because the static electricity has a high voltage, insulation breakdown may be caused. Therefore, the static electricity is conducted to the metal housing through the metal partition wall, and discharged by grounding.

In an implementation, the metal housing and the metal partition wall are integrally formed. In this way, in a process of manufacturing an electronic device, the metal housing and the metal partition wall may be integrally poured, to simplify the manufacturing process. In addition, because the metal housing and the metal partition wall are integrally poured and tightly connected, when the static electricity is conducted, the static electricity may be directly conducted to the metal housing through the metal partition wall, and discharged by grounding, so that a grounding effect is good.

In an implementation, the insulation frame includes a plastic border frame. In this way, in the manufacturing process of the electronic device, a poor signal caused by a metal border frame may be prevented. Plastic, as a stable insulating material, can reduce an impact on antenna performance.

In an implementation, the screen module includes a display surface and a back surface disposed opposite to the display surface. The insulation frame is disposed at an outer periphery of the screen module. The metal housing is disposed on a side of the back surface. According to this implementation, positions of the screen module, the insulation frame, and the metal housing are specifically limited, to ensure that the technical solutions shown in this application are appropriate for an electronic device disposed in the disposing manner.

In an implementation, the insulation layer is a metal anodic oxide layer disposed on a surface of the metal partition wall. After surface anodizing is performed on a metal material, corrosion resistance, hardness, wear resistance, insulation, and heat resistance of the metal anodic oxide layer are greatly improved. When an insulation layer of the metal partition wall is made of the metal anodic oxide layer, direct current insulation can be ensured.

In an implementation, the metal anodic oxide layer includes an aluminum anodic oxide layer. When anodizing is performed, performance of aluminum is excellent. After aluminum anodizing and sealing with hot water, high-temperature steam, or nickel salt is performed on the aluminum anodic oxide layer, corrosion resistance and wear resistance of the aluminum anodic oxide layer can be further improved.

In an implementation, the conductive layer includes at least any one of the following materials: conductive silver paste, a conductive copper sheet, conductive graphite, and conductive fabric. In this way, based on specific disposing of the electro-static discharge protection structure, a plurality of materials may be selected as materials of the conductive layer.

In an implementation, the first side edge further includes a third surface. The third surface is disposed on a side, facing the metal housing, of the first side edge. There is a gap between the third surface and the metal housing. In the implementation, the insulation layer is disposed between the first side edge and the metal partition wall, and the metal partition wall plays a role in clamping. Therefore, the third surface does not need to be closely attached to the metal housing, the insulation frame and the metal housing do not need to be fastened with adhesive, and direct current insulation is implemented while the metal partition wall is clamped. This prevents an increase of a width of a black edge of a screen caused by fastening the insulation frame to the metal housing with the conductive adhesive, and also prevents an impact on the antenna performance caused by the RSE risk for an antenna due to poor grounding of the conductive adhesive.

In an implementation, an antenna area is disposed on a side, opposite to the screen module, of the insulation frame. Due to a demand for a signal strength, the antenna is usually disposed near the border frame. The antenna area is disposed on the side of the insulation frame, so that an impact on signal transmission is smaller.

In an implementation, the electro-static discharge protection structure is used in a foldable electronic device. Because the foldable electronic device is deformed in a folding process, risks of RSE and secondary discharge caused by poor grounding cannot be prevented in the current technical solutions. The electro-static discharge protection structure provided in this implementation is appropriate for the foldable electronic device, so that the risks of RSE and secondary discharge caused by poor grounding may be prevented.

According to a second aspect, this application further provides an electronic device. The electronic device includes the electro-static discharge protection structure according to the first aspect and any one of the implementations in the first aspect.

According to the electronic device provided in this application, because an insulation layer is disposed on n end surface of a metal partition wall, direct current insulation is implemented between the junction surface and the end surface. This prevents an RSE risk caused by conventional poor grounding. When entering from a side edge of a screen module, static electricity is conducted to the junction surface through a continuous conductive layer disposed on a second surface, a first surface, and the junction surface. Because the static electricity has a high voltage, insulation breakdown may be caused. Therefore, the static electricity is conducted to a metal housing through the metal partition wall, and discharged by grounding.

DESCRIPTION OF EMBODIMENTS

Compared with a conventional screen, a flexible screen has features of strong flexibility and foldability, and provides a user with a new foldability-based interaction mode, to meet more requirements of the user for an electronic device. An active-matrix organic light-emitting diode (Active-matrix organic light-emitting diode, AMOLED) is a display technology. An AMOLED flexible screen has characteristics of a wide display color range, low power consumption, and good flexibility. An existing foldable electronic device (for example, a foldable mobile phone) usually uses the AMOLED flexible screen as a display.

Figure 1:
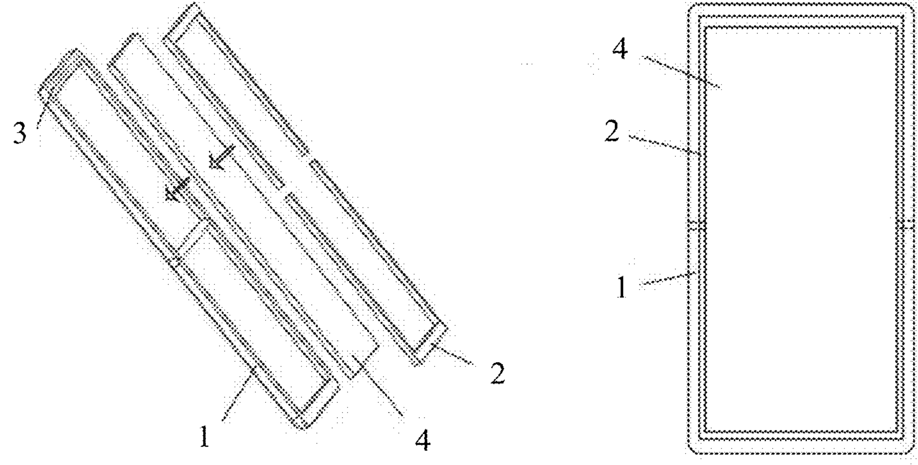
FIG. 1 is a diagram of an assembly scenario of a screen module according to this application.

FIG. 1 is a diagram of an assembly scenario of a screen module according to this application. As shown in FIG. 1, a foldable mobile phone is used as an example. First, a screen module 4 is assembled into a metal housing 1, and clamped to, through a border frame 2, a metal partition wall 3 connected on the metal housing 1, so that the screen module 4 is buckled on the metal housing 1 through the border frame 2. In addition, the border frame 2 may also cover a gap formed between the screen module 4 and the metal housing 1.

At present, an antenna of an electronic device is usually designed on a side of a side edge of the screen module. Enough wide space (for example, a clearance area) around the antenna of the electronic device is to be provided, without shielding or interference, to enable radiation intensity of signals at 360° in all directions at a cross section of the antenna to be the same, achieving a best communication effect. Because metal causes significant interference to the antenna, in the assembly scenario of the screen module shown in FIG. 1, the border frame is usually an insulation frame.

Figure 2:
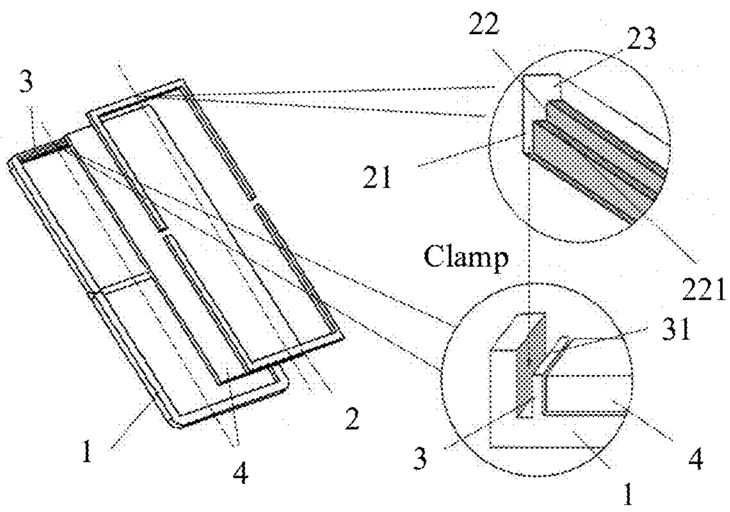
FIG. 2 is a schematic sectional view of assembly of a screen module according to this application.
Figure 3:
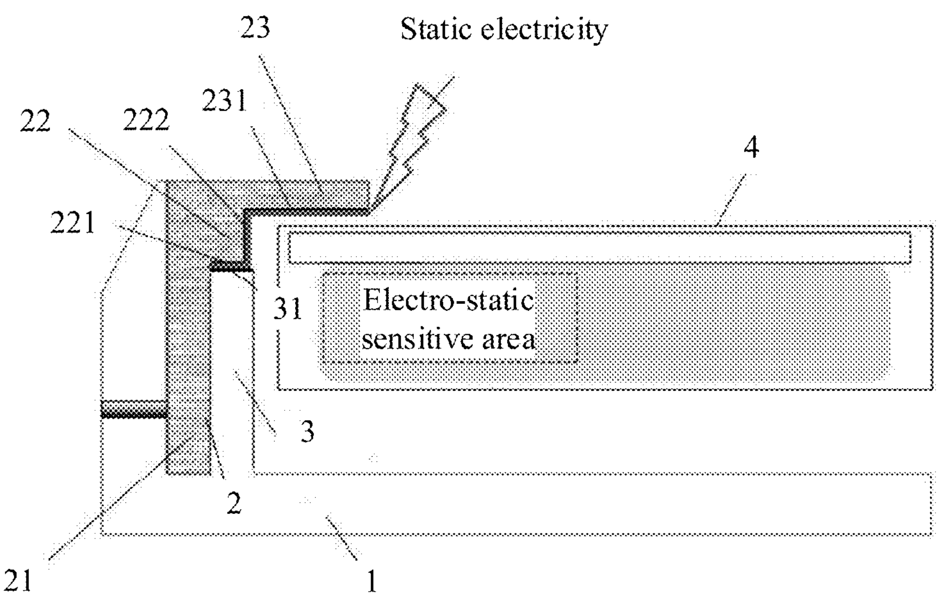
FIG. 3 is a schematic diagram of a specific disposing manner of assembly of a screen module according to this application.

FIG. 2 is a schematic sectional view of assembly of a screen module according to this application. FIG. 3 is a schematic diagram of a specific disposing manner of assembly of a screen module according to this application. As shown in FIG. 2 and FIG. 3, when split along dotted lines in FIG. 2, one end of a metal partition wall 3 is connected to a metal housing 1, and the other end of the metal partition wall 3 extends in a direction away from the metal housing 1. An end surface 31 is formed at one end away from the metal housing 1. A screen module 4 is disposed on a side of the metal partition wall 3. An edge of an insulation frame 2 is used as an example. The insulation frame 2 includes a first side edge 21, a connection part 22, and a second side edge 23. The first side edge 21 is disposed on a side, opposite to the screen module 4, of the metal partition wall 3. The connection part 22 is disposed at one end, away from the metal housing 1, of the first side edge 21. The connection part 22 includes a junction surface 221 facing the metal housing 1 and a first surface 222 facing the screen module 4. The second side edge 23 is disposed on a side, facing the screen module 4, of the connection part 22. The second side edge 23 includes a second surface 231 facing the screen module 4. A continuous conductive layer is disposed on the junction surface 221, the first surface 222, and the second surface 231. The first side edge 21 is configured to be clamped to a groove formed by the metal partition wall 3 and the metal housing 1. The connection part 22 includes the junction surface 221. The junction surface 221 is connected to the end surface 31, to conduct static electricity. The second side edge 23 is configured to fasten the screen module 4. It should be noted that, as shown in a dashed-line box in FIG. 3, an electro-static sensitive area is disposed on a side of a side edge of the screen module, so that the static electricity easily enters along the side edge of the screen module.

Figure 4:
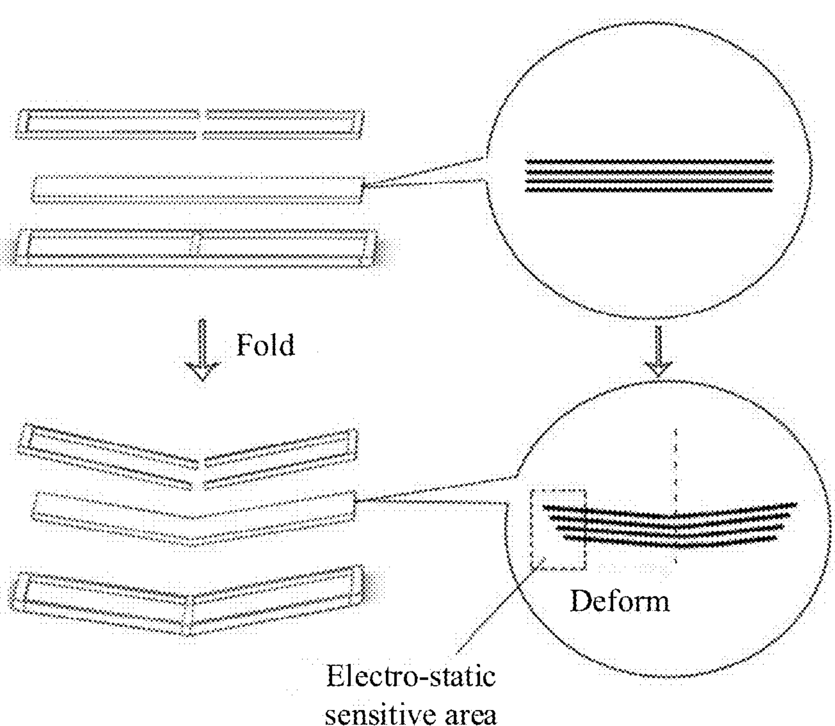
FIG. 4 is a diagram of a folding scenario of a screen module according to this application.

FIG. 4 is a diagram of a folding scenario of a screen module according to this application. An AMOLED flexible screen is used as an example. Because the AMOLED flexible screen is formed by packaging a polymer substrate and a series of organic films, the AMOLED flexible screen is essentially a multi-layer structure. When the screen module is folded, the screen module is deformed as shown in FIG. 4 because of a specific thickness of the screen module. A polymer substrate layer of the screen module is folded at an outermost layer, and therefore, this layer is slightly deformed. When a thickness increases, an organic film layer away from a folding position is gradually severely deformed.

There is static electricity on a side edge of the screen module. In the AMOLED flexible screen, the AMOLED flexible screen is formed by packaging the polymer substrate and the series of organic films. As shown in a dashed-line box in FIG. 4, because an electro-static sensitive area is disposed on a side of the side edge the screen module of the AMOLED flexible screen, the static electricity is easily generated, easily enters along the side edge of the screen module, and then is transmitted to other areas through a conductive layer. Static electricity has characteristics of long-time accumulation, a high voltage, a low battery level, a small current, and a short action event. Electro-static discharge may cause frequent freezing, automatic power-off, poor image quality and volume, unstable signal quality, and the like of the mobile phone. Therefore, ESD has become important content for quality control of an electronic product. ESD certification is to be performed in a process of launching an electronic device on the market. Therefore, electro-static discharge protection is important to the electronic device. An existing strategy to resolve the static electricity is insulation or grounding.

In a foldable electronic device, a screen module is deformed in a folding process. Therefore, relative sliding between the screen module and an insulation frame that is used to cover a gap formed between the screen module and a metal housing is generated, and insulation may not be implemented by adhering with a conventional hot melt adhesive or back adhesive, and the screen module is easily damaged. Therefore, in the foldable electronic device, the electro-static discharge protection is usually implemented by grounding.

Figure 5:
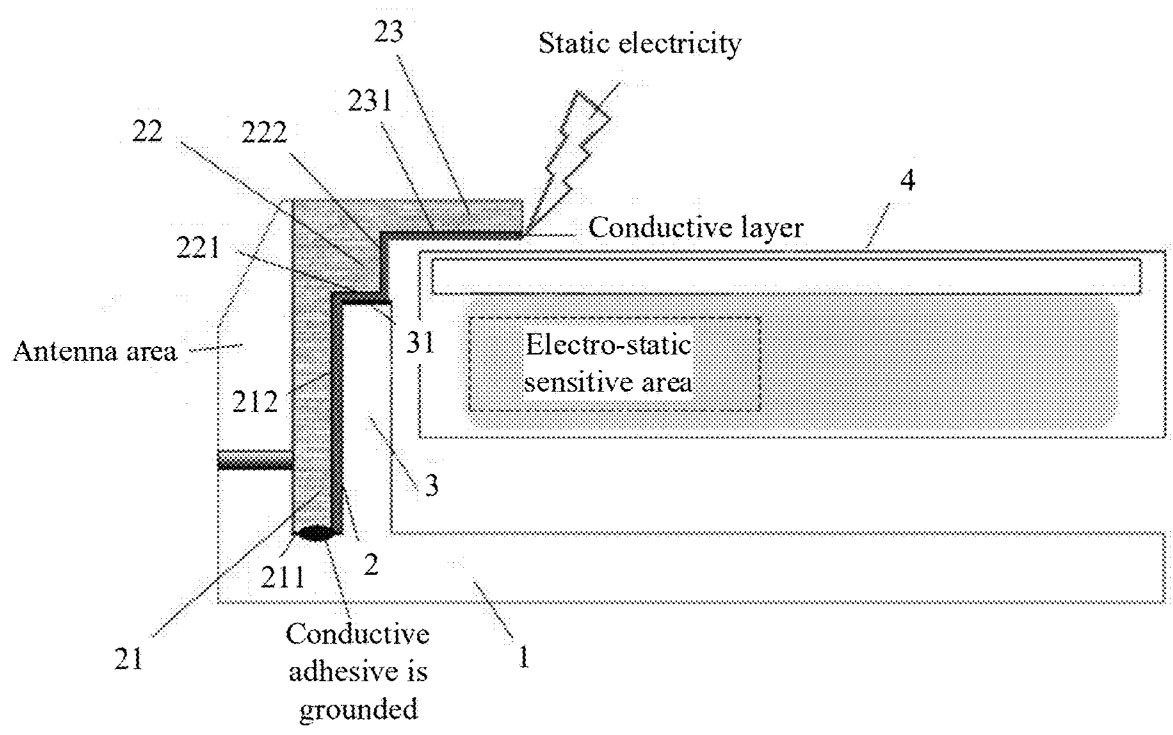
FIG. 5 is a schematic diagram of an electro-static discharge protection structure according to this application.

FIG. 5 is a schematic diagram of an electro-static discharge protection structure according to this application. As shown in FIG. 5, a first side edge 21 includes a third surface 211 facing a side of a metal housing 1 and a fourth surface 212 facing a side of a screen module. A continuous conductive layer is disposed on a second surface 231, a first surface 222, a junction surface 221, and the fourth surface 212. Conductive adhesive is disposed between the third surface 211 and the metal housing 1, and the conductive layer is connected to the metal housing 1 with the conductive adhesive. When entering from a side edge of the screen module, charges of static electricity are conducted to the conductive adhesive along the conductive layers, then conducted to the metal housing 1 with the conductive adhesive, and finally discharged by grounding. Therefore, in a process of manufacturing the electro-static discharge protection structure, the conductive adhesive is dispensed at a bottom of a groove formed by a metal partition wall 3 and the metal housing 1. An existing manufacturing process does not guarantee uniformity and compactness of dispensing. To ensure performance and a degree of adhesion of the conductive adhesive, when the adhesive is dispensed in a groove with a specific depth, an amount of the conductive adhesive may increase a width of a black edge of a screen. This affects competitiveness on appearance of a product. In addition, because an antenna area is disposed on a side, opposite to the screen module 4, of an insulation frame 2, an antenna is disposed away from a component that causes interference as much as possible, to prevent harmonic interference caused by the component to the antenna. According to the electro-static discharge protection structure shown in FIG. 5, because the antenna area is close to grounding positions of the conductive layer and the conductive adhesive, an RSE risk is easily caused by poor grounding.

Figure 6:
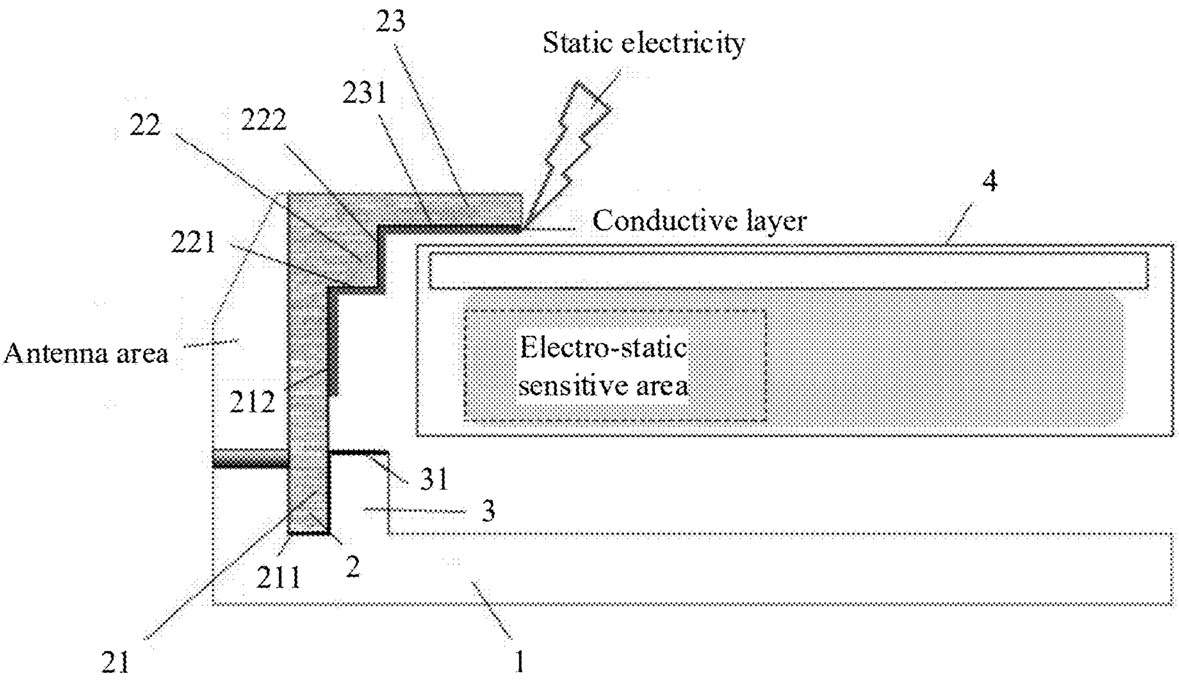
FIG. 6 is a schematic diagram of another electro-static discharge protection structure according to this application.

A discharge in a gap includes two metal electrodes. One electrode is fastened to an insulator, the other electrode is connected to a grounding apparatus through an auxiliary gap, and a specified gap distance is maintained between the two electrodes. When an instantaneous overvoltage strikes, the gap is broken down, and a part of overvoltage charges are introduced into the ground. This prevents a voltage on a protected device from rising. FIG. 6 is a schematic diagram of another electro-static discharge protection structure. Static electricity is discharged in a gap. As shown in FIG. 6, a continuous conductive layer is disposed on a second surface 231, a first surface 222, a junction surface 221, and a fourth surface 212. A conductive layer disposed on the fourth surface 212 extends from one end, away from the metal housing 1, of the first side edge 21 to a middle position of a first side edge 21, and is equivalent to an electrode fastened to an insulator. A specified gap distance is maintained between the conductive layer on the fourth surface 212 and the metal partition wall 3 for the discharge in a gap. A metal partition wall 3 and a metal housing 1 are connected and grounded to discharge static electricity. The metal partition wall 3 is equivalent to an electrode connected to a grounding apparatus through an auxiliary gap. When the static electricity enters from a side edge of a screen module 4, charges of the static electricity are conducted along the conductive layer to break down the gap, conducted to the metal housing 1 through the metal partition wall 3, and discharged by grounding.

Secondary discharge means abnormal discharge on a machined surface due to an intervention of a pitting corrosion product and the like. During this abnormal discharge, arc sparks are produced. Such secondary discharge in an electronic device may cause a problem of freezing or poor call quality of a mobile phone. An existing technology of mounting a conductive layer is not advanced when the conductive layer is disposed. Taking a conductive copper sheet as an example, in the electro-static discharge protection structure shown in FIG. 6, the conductive layer on the fourth surface 212 extends from the one end, away from the metal housing 1, of the first side edge 21 to a middle position of the fourth surface 212. A specific gap is to be disposed between the conductive layer and the metal partition wall 3. If the conductive layer is made of the conductive copper sheet, due to limitations of the mounting technology, the conductive copper sheet is not fastened at the middle position and easily curls. When the electro-static discharge protection structure is disposed in a foldable electronic device, the screen module 4 is deformed in a folding process of the electronic device. Therefore, the gap distance between the conductive layer and the metal partition wall 3 changes due to folding, and a curled conductive copper sheet is easily in contact with the metal partition wall 3, resulting in the secondary discharge.

To solve the problems in a conventional technology, this embodiment of this application illustrates an electro-static discharge protection structure. According to the electro-static discharge protection structure, static electricity on a side edge of the screen module 4 is effectively discharged, electro-static discharge protection is effectively provided for each side edge of the screen module 4, antenna performance is ensured, and risks of RSE and secondary discharge caused by poor grounding in the conventional technology are prevented.

Figure 7:
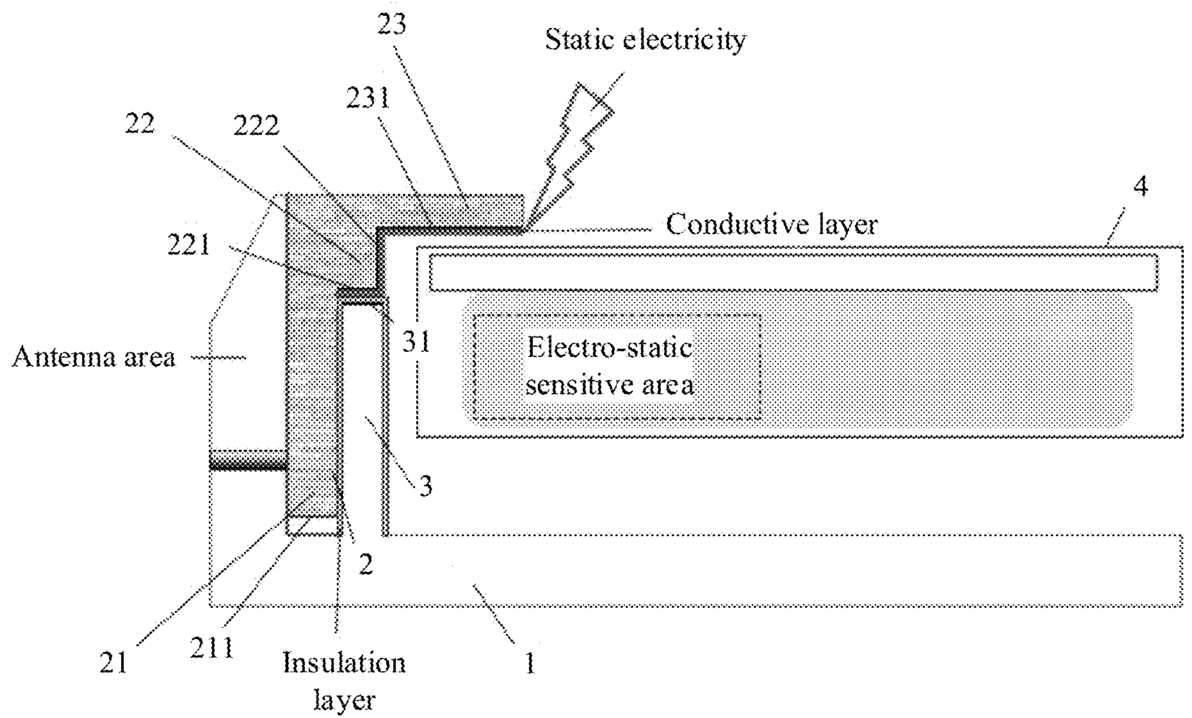
FIG. 7 is a schematic diagram of an electro-static discharge protection structure according to an embodiment of this application.

FIG. 7 is a schematic diagram of an electro-static discharge protection structure according to an embodiment of this application. As shown in FIG. 7, the electro-static discharge protection structure provided in this embodiment of this application includes: a metal housing 1, an insulation frame 2, and a metal partition wall 3. One end of the metal partition wall 3 is connected to the metal housing 1, and the other end of the metal partition wall 3 extends in a direction away from the metal housing 1. An end surface 31 is formed at one end away from the metal housing 1. The screen module 4 is disposed on a side of the metal partition wall 3. The insulation frame 2 includes a first side edge 21, a connection part 22, and a second side edge 23. The first side edge 21 is disposed on a side, opposite to the screen module 4, of the metal partition wall 3. An insulation layer is disposed between the first side edge 21 and the metal partition wall 3. The connection part 22 is disposed at one end, away from the metal housing 1, of the first side edge 21. The connection part 22 includes a junction surface 221 attached to an end surface 31 and a first surface 222 facing the screen module 4. An insulation layer is disposed between the junction surface 221 and the end surface 31, and an insulation layer is disposed between the metal partition wall 3 and the screen module 4. The second side edge 23 is disposed on a side, facing the screen module 4, of the connection part 22. The second side edge 23 includes a second surface 231 facing the screen module. A continuous conductive layer is disposed on the junction surface 221, the first surface 222, and the second surface 231. Because an insulation layer is disposed on the end surface 31 of the metal partition wall 3, direct current insulation is implemented between the junction surface 221 and the end surface 31. This prevents an RSE risk caused by conventional poor grounding. When entering from a side edge of the screen module 4, static electricity is conducted to the junction surface 221 through the continuous conductive layer disposed on the second surface 231, the first surface 222, and the junction surface 221, and the junction surface 221 is closely attached to the end surface 31. Because the static electricity has a high voltage, insulation breakdown may be caused, and the insulation layer of the end surface 31 is broken down. Therefore, the static electricity is conducted to the metal housing 1 through the metal partition wall 3, and discharged by grounding.

In an implementation, the metal partition wall 3 is perpendicular to the metal housing 1. The metal partition wall 3 includes but is not limited to a solid cuboid or a hollow cuboid. When the metal partition wall 3 is the solid cuboid, a manufacturing process is simple, and the metal partition wall is easily poured and conductive entirely. When the metal partition wall 3 is the hollow cuboid, some of materials are reduced in a manufacturing process, and this facilitates heat dissipation of the screen module 4. The first side edge 21 and the second side edge 23 are perpendicularly disposed in an L-shape, and the connection part 22 is disposed at a corner of the L-shape. The first surface 222 and a side edge, facing a side of the screen module 4, of metal partition wall 3 are located on a same plane. The metal housing 1, the metal partition wall 3, the first surface 222, and the second surface 231 form space for accommodating the screen module 4. A side edge, opposite to the screen module 4, of the metal partition wall 3 and the metal housing 1 form a rectangular groove, and the rectangular groove is clamped to the first side edge 21.

In an implementation, the metal housing and the metal partition wall are integrally formed. In this way, in a process of manufacturing an electronic device, the metal housing and the metal partition wall may be integrally poured, to simplify the manufacturing process. In addition, because the metal housing and the metal partition wall are integrally poured and tightly connected, when the static electricity is conducted, the static electricity may be directly conducted to the metal housing through the metal partition wall, and discharged by grounding, so that a grounding effect is good.

Figure 8:
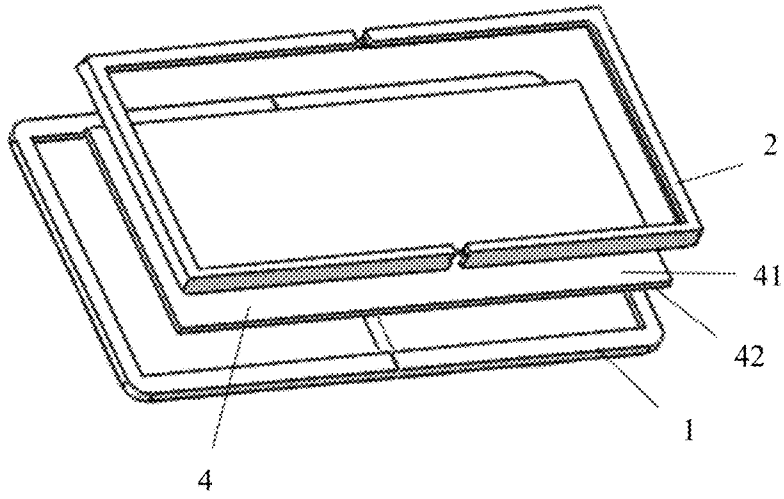
FIG. 8 is a schematic diagram of a disposing manner of a screen module according to an embodiment of this application.

FIG. 8 is a schematic diagram of a disposing manner of a screen module according to an embodiment of this application. As shown in FIG. 8, in an implementation, a screen module 4 includes a display surface 41 and a back surface 42 disposed opposite to the display surface 41. An insulation frame 2 is disposed at an outer periphery of the screen module 4. A metal housing 1 is disposed on a side of the back surface 42. According to this implementation, positions of the screen module 4, the insulation frame 2, and the metal housing 1 are specifically limited, to ensure that the technical solutions shown in this application are appropriate for an electronic device disposed in the disposing manner. Because an AMOLED flexible screen is formed by packaging a polymer substrate and a series of organic films, the AMOLED flexible screen is essentially a multi-layer structure.

Figure 9:
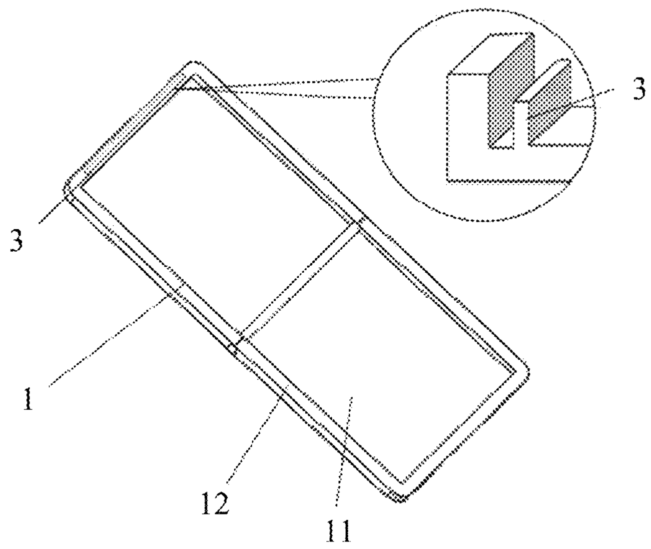
FIG. 9 is a schematic diagram of a metal middle frame according to an embodiment of this application.

In an implementation, the metal housing 1 is a metal middle frame. FIG. 9 is a schematic diagram of a metal middle frame according to an embodiment of this application. As shown in FIG. 9, the metal middle frame generally includes a middle plate 11 and a metal border frame 12 surrounding edges of the middle plate 11. The metal middle frame may be considered as a supporting structure of an electronic device. Components such as a main board, a camera, a speaker, a battery, and a receiver in the electronic device may be fastened to the metal middle frame. A metal partition wall 3 on the metal middle frame may be configured to fasten a screen module. A groove formed by the metal middle frame and the metal partition wall 3 is configured to be clamped to an insulation frame 2. This enables the screen module 4 to be buckled on the metal middle frame through the insulation frame 2, and cover a gap between the screen module 4 and the metal middle frame.

In an implementation, the metal housing 1 is configured to implement grounding. If the metal housing 1 is the metal middle frame, the metal middle frame may be grounded to achieve a purpose of discharging static electricity.

In an implementation, the insulation frame 2 includes a plastic border frame. In a manufacturing process of the electronic device, a poor signal caused by the metal border frame may be prevented. Plastic, as a stable insulating material, can reduce an impact on antenna performance. An insulating material of the insulation frame 2 shown in this application includes but is not limited to plastic, and may also be other insulating materials such as plastic.

In an implementation, an insulation layer is a metal anodic oxide layer disposed on a surface of the metal partition wall 3. After surface anodizing is performed on a metal material, corrosion resistance, hardness, wear resistance, insulation, and heat resistance of the metal anodic oxide layer are greatly improved. When an insulation layer of the metal partition wall is made of the metal anodic oxide layer, direct current insulation can be improved. Under a condition of no static electricity, because the metal anodic oxide layer is disposed on an outer side of the metal partition wall 3, insulation performance is good. Therefore, under normal circumstances, the metal partition wall is in a direct current insulation state, electric charges are not conducted, and there is a small impact on an antenna area. When static electricity enters along a side edge of a screen, because the static electricity has a high voltage, insulation breakdown may be caused, and the conductive layer conducts the static electricity to the metal partition wall through the junction surface and then is grounded through the metal housing.

In an implementation, the metal anodic oxide layer includes an aluminum anodic oxide layer. When anodizing is performed, performance of aluminum is excellent. After aluminum anodizing and sealing with hot water, high-temperature steam, or nickel salt is performed on the aluminum anodic oxide layer, corrosion resistance and wear resistance of the aluminum anodic oxide layer can be further improved.

In an implementation, the conductive layer includes at least any one of the following materials: conductive silver paste, a conductive copper sheet, conductive graphite, and conductive fabric. In this way, based on specific disposing of the electro-static discharge protection structure, a plurality of materials may be selected as materials of the conductive layer. Because the conductive layer shown in this embodiment of this application is disposed only on the junction surface 221, the first surface 222, and the second surface 231, the conductive layer shown in this application is disposed more simply, and a tolerance of a gap between the insulation frame 2 and the metal partition wall 3 may be reduced. That is, an error of mounting the conductive layer is not considered. Taking the copper sheet as an example, if the conductive layer of this application is made of the conductive copper sheet, in comparison with the electro-static discharge protection structure shown in FIG. 7, a difficulty in mounting the conductive copper sheet is reduced, and when the screen module is folded, a risk that the screen module is damaged because the screen module is scratched by a curled conductive copper sheet may be prevented.

In an implementation, the first side edge 21 further includes a third surface 211. The third surface 211 is disposed on a side, facing the metal housing 1, of the first side edge 21. There is a gap between the third surface 211 and the metal housing 1. The insulation layer is disposed between the first side edge 21 and the metal partition wall 3, and the metal partition wall 3 plays a role in clamping. Therefore, the third surface 211 does not need to be closely attached to the metal housing 1 and fastened with adhesive, and the direct current insulation is implemented while the metal partition wall 3 is clamped. This prevents an increase of a width of a black edge of a screen caused by fastening the metal housing with conductive adhesive, and also prevents an RSE risk for an antenna caused by poor grounding. It should be noted that, the gap between the third surface 211 and the metal housing 1 may be used to control tightness of attaching of the junction surface 221 to the end surface 31, and then control an effect of breaking down the insulation layer by the static electricity. The insulation frame 2 is generally made of a deformable material. Therefore, when the first side edge 21 is clamped to the metal partition wall 3 and the gap is small, the junction surface 221 is closely attached to the end surface 31. When the first side edge 21 is clamped to the metal partition wall 3 and the gap is large, there is a small gap between the junction surface 221 and the end surface 31, and the static electricity is conducted in a manner of jump in a small gap.

In an implementation, an antenna area is disposed on a side, opposite to the screen module, of the insulation frame 2. Due to a demand for a signal strength, the antenna is usually disposed near the border frame. The antenna area is disposed on the side of the insulation frame, so that an impact on signal transmission is smaller.

In an implementation, the electro-static discharge protection structure is used in a foldable electronic device. Because the foldable electronic device is deformed in a folding process, risks of RSE and secondary discharge caused by poor grounding cannot be prevented in the current technical solutions.

An embodiment of this application further provides an electronic device. The electronic device includes the electro-static discharge protection structure provided in the foregoing embodiments. The electronic device may include, for example, a mobile terminal, a tablet computer, a personal computer, a workstation device, a large screen device (for example, a smart screen and an intelligent television), a handheld game console, a home game console, a virtual reality device, an augmented reality device, a mixed reality device, an intelligent vehicle terminal, a self-driving vehicle, customer-premises equipment (customer-premises equipment, CPE), and the like.

According to the electronic device provided in this application, because an insulation layer is disposed on an end surface of a metal partition wall, direct current insulation is implemented between a junction surface and the end surface. This prevents a risk of RSE caused by conventional poor grounding. When entering from a side edge of a screen module, static electricity is conducted to a junction surface through a continuous conductive layer disposed on a second surface, a first surface, and the junction surface. Because the static electricity has a high voltage, insulation breakdown may be caused. Therefore, the static electricity is conducted to a metal housing through the metal partition wall, and discharged by grounding.

What is claimed is:

1. An electro-static discharge protection structure, comprising a metal housing, an insulation frame, and a metal partition wall, wherein one end of the metal partition wall is connected to the metal housing, the other end of the metal partition wall extends in a direction away from the metal housing, to form an end surface at one end away from the metal housing, and a screen module is disposed on a side of the metal partition wall;

the insulation frame comprises a first part located above the screen module and a second part located above the metal partition wall; and a continuous conductive layer is disposed between the first part of the insulation frame and the screen module, and the conductive layer extends from above the screen module to a position between the metal partition wall and the second part of the insulation frame; and the second part of the insulation frame comprises a junction surface, and the junction surface faces the end surface of the metal partition wall; an insulation layer is disposed between the junction surface and the end surface, and the insulation layer is disposed between the conductive layer and the end surface; and the insulation layer is an insulation layer that can be broken down by static electricity.

2. The electro-static discharge protection structure according to claim 1, wherein the junction surface and the end surface are disposed face to face.

3. The electro-static discharge protection structure according to claim 1, wherein the metal housing and the metal partition wall are integrally formed.

4. The electro-static discharge protection structure according to claim 1, wherein the insulation frame comprises a plastic frame.

5. The electro-static discharge protection structure according to claim 1, wherein the screen module comprises a display surface and a back surface disposed opposite to the display surface;

the insulation frame is disposed at an outer periphery of the screen module; and the metal housing is disposed on a side of the back surface.

6. The electro-static discharge protection structure according to claim 1, wherein the insulation layer is a metal anodic oxide layer disposed on a surface of the metal partition wall.

7. The electro-static discharge protection structure according to claim 1, wherein the conductive layer comprises at least any one of the following materials: conductive silver paste, a conductive copper sheet, conductive graphite, and conductive fabric.

8. A foldable electronic device, comprising a metal housing, an insulation frame, a metal partition wall, and a screen module, wherein one end of the metal partition wall is connected to the metal housing, the other end of the metal partition wall extends in a direction away from the metal housing, to form an end surface at one end away from the metal housing, and the screen module is disposed on a side of the metal partition wall;

the insulation frame comprises a first part located above the screen module and a second part located above the metal partition wall; and a continuous conductive layer is disposed between the first part of the insulation frame and the screen module, and the conductive layer extends from above the screen module to a position between the metal partition wall and the second part of the insulation frame; and the second part of the insulation frame comprises a junction surface, and the junction surface faces the end surface of the metal partition wall; an insulation layer is disposed between the junction surface and the end surface, and the insulation layer is disposed between the conductive layer and the end surface.

9. The foldable electronic device according to claim 8, wherein the junction surface and the end surface are disposed face to face.

10. The foldable electronic device according to claim 8, wherein the metal housing and the metal partition wall are integrally formed.

11. The foldable electronic device according to claim 8, wherein the insulation frame comprises a plastic frame.

12. The foldable electronic device according to claim 8, wherein the screen module comprises a display surface and a back surface disposed opposite to the display surface;

the insulation frame is disposed at an outer periphery of the screen module; and the metal housing is disposed on a side of the back surface.

13. The foldable electronic device according to claim 8, wherein the insulation layer is a metal anodic oxide layer disposed on a surface of the metal partition wall.

14. The foldable electronic device according to claim 13, wherein the metal anodic oxide layer comprises an aluminum anodic oxide layer.

15. The foldable electronic device according to claim 8, wherein the conductive layer comprises at least any one of the following materials: conductive silver paste, a conductive copper sheet, conductive graphite, and conductive fabric.

16. The foldable electronic device according to claim 8, wherein the insulation frame further comprises a third part, the third part is disposed on a side, away from the screen module, of the metal partition wall, and there is a gap between the third part and the metal housing.

17. The foldable electronic device according to claim 8, wherein the insulation frame further comprises a third part, the third part is disposed on a side, away from the screen module, of the metal partition wall, and the third part comprises a third surface;

the third surface is a surface, facing the metal housing, of the insulation frame; and there is a gap between the third surface and the metal housing.

18. The foldable electronic device according to claim 8, wherein an antenna area is disposed on a side, opposite to the screen module, of the insulation frame.

19. The foldable electronic device according to claim 8, wherein the insulation layer can be broken down by electricity.

20. The foldable electronic device according to claim 8, wherein the metal housing, the insulation frame, and the metal partition wall are disposed at an edge of the screen of the foldable electronic device.

* * * * *